(12) United States Patent
Erhart et al.

(10) Patent No.: US 7,778,397 B2
(45) Date of Patent: Aug. 17, 2010

(54) DYNAMIC VIDEO GENERATION IN INTERACTIVE VOICE RESPONSE SYSTEMS

(75) Inventors: George William Erhart, Pataskala, OH (US); Valentine C. Matula, Granville, OH (US); David Joseph Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 1040 days.

(21) Appl. No.: 11/076,597

(22) Filed: Mar. 10, 2005

(65) Prior Publication Data

US 2006/0203977 A1 Sep. 14, 2006

(51) Int. Cl.
*H04M 11/00* (2006.01)

(52) U.S. Cl. ............... 379/88.14; 370/352; 370/353; 370/354; 370/355; 370/356; 379/88.01; 379/88.04; 379/88.13; 379/88.18; 379/201.01; 455/414.1; 455/414.4; 704/270; 704/272; 704/277; 709/201; 709/202; 709/203; 715/203; 715/204; 715/744

(58) Field of Classification Search ......... 370/351–356; 379/88.01–88.06, 88.13, 88.14, 88.17, 88.18, 379/201.01, 265.09; 455/414.1, 414.4; 700/86–89; 704/270, 272, 277; 709/201–203; 715/203–204, 715/744
See application file for complete search history.

(56) References Cited

U.S. PATENT DOCUMENTS

| | | | | |
|---|---|---|---|---|
| 5,802,526 A | * | 9/1998 | Fawcett et al. | 707/104.1 |
| 5,830,068 A | * | 11/1998 | Brenner et al. | 463/42 |
| 5,873,068 A | * | 2/1999 | Beaumont et al. | 705/14 |
| 6,091,805 A | * | 7/2000 | Watson | 379/93.17 |
| 6,246,989 B1 | * | 6/2001 | Polcyn | 704/275 |
| 6,320,946 B1 | * | 11/2001 | Enzmann et al. | 379/143 |
| 6,418,199 B1 | * | 7/2002 | Perrone | 379/88.01 |
| 6,546,002 B1 | * | 4/2003 | Kim | 370/351 |
| 6,587,822 B2 | * | 7/2003 | Brown et al. | 704/275 |

(Continued)

FOREIGN PATENT DOCUMENTS

JP 2001109762 4/2001

(Continued)

OTHER PUBLICATIONS

S. Choudhury, "Canadian Application No. 2,537,741 Office Action", May 30, 2008, Published: CIPO, Published in: CA.

(Continued)

*Primary Examiner*—Hemant Patel
(74) *Attorney, Agent, or Firm*—DeMont & Breyer, LLC

(57) ABSTRACT

A method and apparatus are disclosed that enable an interactive voice response (IVR) system to generate video content in addition to audio content (e.g., synthesized speech, etc.). The video content is based on the state of the IVR system, the video display capacity of the calling telecommunications terminal, and information supplied by the user via a telecommunications terminal. The illustrative embodiment generates video content based on the text from which the audio content is generated. In particular, the video content comprises an abridged version of this text that is suitable for display at the telecommunications terminal. In the illustrative embodiment, the abridged version of the text is generated via syntactic and semantic processing. In addition, an abridged version of user-supplied information is generated and incorporated into the video content.

17 Claims, 9 Drawing Sheets

U.S. PATENT DOCUMENTS

| | | | |
|---|---|---|---|
| 6,616,700 B1* | 9/2003 | Thum et al. | 715/273 |
| 6,717,593 B1* | 4/2004 | Jennings | 715/760 |
| 6,834,100 B2 | 12/2004 | Reynolds | |
| 6,912,581 B2* | 6/2005 | Johnson et al. | 709/228 |
| 7,054,818 B2* | 5/2006 | Sharma et al. | 704/270 |
| 7,065,188 B1* | 6/2006 | Mei et al. | 379/88.23 |
| 7,117,152 B1* | 10/2006 | Mukherji et al. | 704/235 |
| 7,151,763 B2* | 12/2006 | Koch et al. | 370/338 |
| 7,185,116 B2* | 2/2007 | Apfel et al. | 709/203 |
| 7,406,658 B2* | 7/2008 | Brassell et al. | 715/239 |
| 7,614,075 B2* | 11/2009 | McDowell et al. | 725/133 |
| 2002/0120684 A1* | 8/2002 | Christfort et al. | 709/203 |
| 2002/0173299 A1* | 11/2002 | Buchholz et al. | 455/418 |
| 2003/0005076 A1* | 1/2003 | Koch et al. | 709/217 |
| 2003/0120762 A1* | 6/2003 | Yepishin et al. | 709/223 |
| 2004/0121814 A1* | 6/2004 | Creamer et al. | 455/563 |
| 2005/0201532 A1* | 9/2005 | Chang | 379/88.17 |
| 2005/0207545 A1* | 9/2005 | Gao et al. | 379/88.17 |
| 2006/0285662 A1* | 12/2006 | Yin et al. | 379/88.16 |
| 2007/0026852 A1* | 2/2007 | Logan et al. | 455/422.1 |

FOREIGN PATENT DOCUMENTS

| | | |
|---|---|---|
| JP | 2002288224 | 10/2002 |

OTHER PUBLICATIONS

Y. Nagata, "JP Application No. 2006-65467 Office Action", Feb. 9, 2009, Publisher: Japanese Patent Office, Published in: JP.

"EP Application No. 06 251 245.4 Office Action Dec. 29, 2009", , Published: EPO, Published in: EP.

Liebhart, M., "EP Application No. 06251245.4-2414 European Search Report Jul. 11, 2006", , Publisher: EPO, Published in: EP.

Yajima, S., "JP Application No. 2006-65467 Office Action Nov. 7, 2007", , Publisher: JPO, Published in: JP.

"Voice augmented menu automated telephone response system", IBM technical disclosure bulletin, IBM Corp., Feb. 1, 1995, vol. 38, No. 2, pp. 57-61, XP000502390, ISSN: 0018-8689, New York, US.

Adel el Hamad, "CA Application No. 2,537,741 Office Action Mar. 11, 2010", , Publisher: CIPO, Published in: CA.

* cited by examiner

Figure 3

```
<vxml version="2.0" xml:lang="en-US" xmlns="http://www.w3.org/2001/vxml"
application="AppRoot.aspx">
<menu id="f_IdentifyPerson">
    <property name="termchar" value="" />
    <property name="interdigittimeout" value="3s" />
    <property name="inputmodes" value="dtmf voice" />
    <noinput>
    <prompt bargein="true" timeout="5s">
        This is the main menu.  Please specify which information you wish to
enter to retrieve your records: For social security number, please press or say 1,,,,.
For account number, which is the 12-digit number found in the yellow box in the
upper-lefthand corner of your monthly statement, please press or say 2,,,,.
    </prompt>
    <choice dtmf="1" next="RetrieveRecord.aspx?Key=0">
        <grammar type="application/srgs+xml" src="IPAddrDTMF.grxml" mode="dtmf"/>
        <rule id="Choice1" scope="public">
            <one-of>
                <item>1</item>
            </one-of>
        </rule>
    </choice>
    <choice dtmf="2" next="RetrieveRecord.aspx?Key=3">
        <grammar src="builtin:grammar/boolean?language=en-US" xml:lang="en-US" />
        <rule id="Choice2" scope="public">
            <one-of>
                <item>2</item>
            </one-of>
        </rule>
    </choice>
</menu>
```

DYNAMIC VIDEO GENERATION IN INTERACTIVE VOICE RESPONSE SYSTEMS

FIELD OF THE INVENTION

The present invention relates to telecommunications in general, and, more particularly, to generating video content in interactive voice response (IVR) systems.

BACKGROUND OF THE INVENTION

Many enterprises employ an interactive voice response (IVR) system that handles calls from telecommunications terminals. An interactive voice response system typically presents a hierarchy of menus to the caller, and prompts the caller for input to navigate the menus and to supply information to the IVR system. For example, a caller might touch the "3" key of his terminal's keypad, or say the word "three", to choose the third option in a menu. Similarly, a caller might specify his bank account number to the interactive voice response system by inputting the digits via the keypad, or by saying the digits. In many interactive voice response systems the caller can connect to a person in the enterprise by either selecting an appropriate menu option, or by entering the telephone extension associated with that person.

FIG. 1 depicts telecommunications system 100 in accordance with the prior art. Telecommunications system 100 comprises telecommunications network 105, private branch exchange (PBX) 110, and interactive voice response system 120, interconnected as shown.

Telecommunications network 105 is a network such as the Public Switched Telephone Network [PSTN], the Internet, etc. that carries a call from a telecommunications terminal (e.g., a telephone, a personal digital assistant [PDA], etc.) to private branch exchange 110. A call might be a conventional voice telephone call, a text-based instant messaging (IM) session, a Voice over Internet Protocol (VoIP) call, etc.

Private branch exchange 110 receives incoming calls from telecommunications network 105 and directs the calls to interactive voice response (IVR) system 120 or to one of a plurality of telecommunications terminals within the enterprise, accordingly. Private branch exchange 110 also receives outbound signals from telecommunications terminals within the enterprise and from interactive voice response system 120, and transmits the signals on to telecommunications network 105 for delivery to the caller's terminal.

As described above, interactive voice response system 120 is a data-processing system that presents one or more menus to the caller and receives input from the caller (e.g., speech signals, keypad input, etc.) via private branch exchange 110. Interactive voice response system 120 is capable of hosting one or more applications, of submitting commands to the applications, of forwarding caller input to the applications, and of receiving output from the applications. In some embodiments interactive voice response system 120 might be a general-purpose server that hosts software applications, while in some other embodiments interactive voice response system 120 might be an "appliance" in which the applications are implemented in hardware (e.g., field-programmable gate arrays [FPGAs], application-specific integrated circuits [ASICs], etc.).

SUMMARY OF THE INVENTION

As video displays become ubiquitous in telecommunications terminals, it would be advantageous if audio content received at a terminal from an interactive voice response (IVR) system were accompanied by relevant video content. For example, menu options that are "spoken" by synthesized speech of an interactive voice response system might also be displayed as text. However, because the video display of a mobile telecommunications terminal is typically limited in size, delivering a textual version of audio content spoken by an interactive voice response system can be problematic. For example, the textual equivalent of "Please say or type your 12-digit account number, found in the yellow box in the upper-lefthand corner of your monthly statement" would be cumbersome to read and understand by the user, particularly on smaller video displays. It would be advantageous, therefore, if video content, and in particular text, were generated such that it could be compactly and neatly displayed on a user's terminal, and therefore more easily read and understood. Moreover, it would be especially advantageous if the generation of such video content were performed automatically by the interactive voice response system, rather than requiring manual human effort (e.g., by a software developer, webpage content producer, etc.).

In the illustrative embodiment of the present invention, an interactive voice response (IVR) system generates video content to accompany the generated audio content, where the video content is based on the state of the IVR system, the video display capacity of the calling telecommunications terminal, and information supplied by the user via the terminal. The illustrative embodiment generates video content based on the text from which audio content is generated. In particular, the video content comprises an abridged version of this text that is suitable for display at the telecommunications terminal. In the illustrative embodiment, the abridged version of the text is generated via syntactic and semantic processing. In addition, an abridged version of user-supplied information is generated and incorporated into the video content.

The illustrative embodiment comprises: generating video content during a call that involves an interactive voice response system and a telecommunications terminal, wherein the video content is based on (i) the state of the interactive voice response system, and (ii) the video display capacity of the telecommunications terminal.

BRIEF DESCRIPTION OF THE DRAWINGS

FIG. 3 depicts an exemplary Voice Extensible Markup Language (VXML) document, in accordance with the illustrative embodiment of the present invention.

DETAILED DESCRIPTION

The terms appearing below are given the following definitions for use in this Description and the appended claims.

For the purposes of the specification and claims, the term "call" is defined as an interactive communication involving one or more telecommunications terminal users. A call might be a traditional voice telephone call, an instant messaging (IM) session, a video conference, etc.

For the purposes of the specification and claims, the term "video display capacity" is defined as the quantity of information (e.g., text, icons, etc.) that can be rendered in the video display such that the information is readable and understandable to a user. As will be appreciated by those skilled in the art, video display capacity is based on the physical size of the video display, the resolution of the video display, the fonts and font sizes available for rendering text in the video display, the color capabilities of the video display, and so forth.

Figure 1:
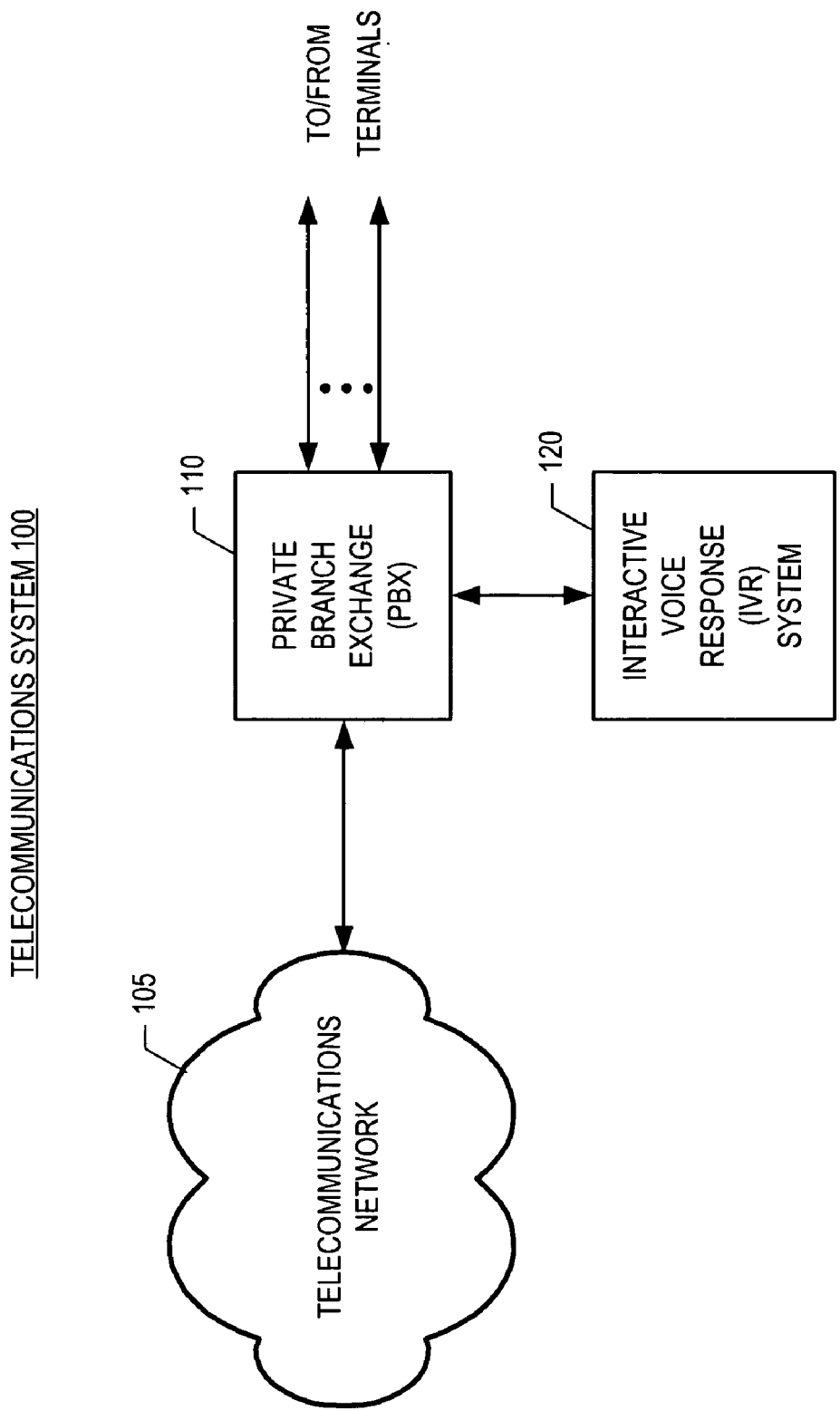
FIG. 1 depicts telecommunications system 100 in accordance with the prior art.
Figure 2:
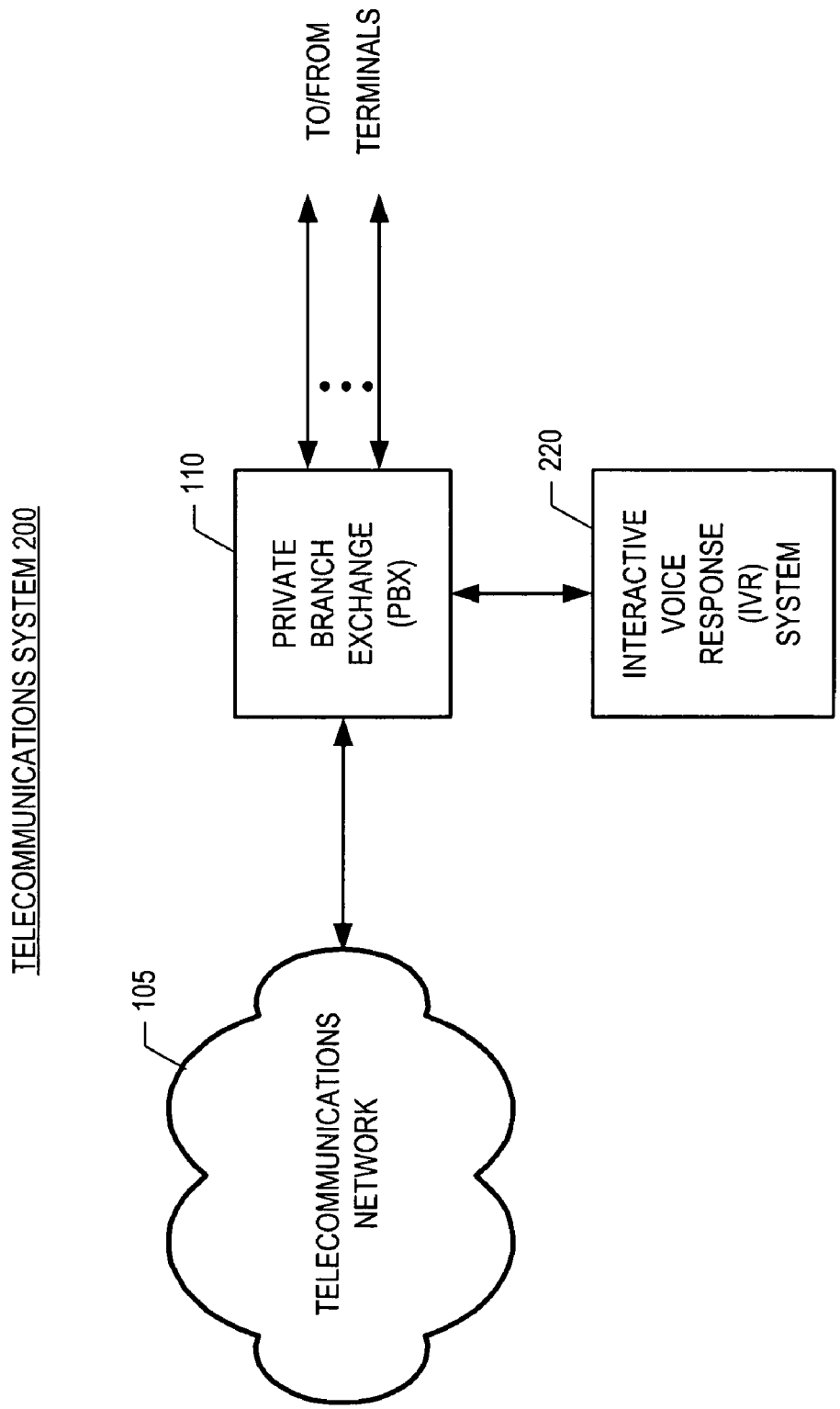
FIG. 2 depicts telecommunications system 200 in accordance with the illustrative embodiment of the present invention.

FIG. 2 depicts telecommunications system 200 in accordance with the illustrative embodiment of the present invention. As shown in FIG. 2, telecommunications system 200 is the same as telecommunications system 100 except that interactive voice response (IVR) system 120 of the prior art is replaced with interactive voice response (IVR) system 220.

Interactive voice response (IVR) system 220 has all the functionality of interactive voice response (IVR) system 120, plus additional functionality as described below and with respect to FIGS. 5 through 9. In particular, this additional functionality comprises the following capabilities: receiving, transmitting, and processing of Voice over Internet Protocol (VoIP) packets; storage and processing associated with Voice Extensible Markup Language (VXML) documents (VXML is described below and with respect to FIG. 3); syntactic and semantic processing of natural language; and generating and transmitting video content.

The Extensible Markup Language, abbreviated XML, is a specification that enables the creation of customized tags, which in turn enables the definition, transmission, validation, and interpretation of data between two applications, organizations, etc. Voice Extensible Markup Language (abbreviated VoiceXML or VXML) is an application of the Extensible Markup Language (XML) that enables dialogs featuring synthesized speech, digitized audio, recognition of spoken and keyed input, recording of spoken input, and telephony. The primary objective of VXML is to bring the advantages of web-based development and content delivery to interactive voice response applications.

FIG. 3 depicts an exemplary Voice Extensible Markup Language (VXML) document, in accordance with the illustrative embodiment of the present invention. The VXML document presents a menu with two options for retrieving a user's records; the first option enables the user to identify himself by entering his social security number, while the second option enables the user to identify his account number. The text between the <prompt> and </prompt> tags is used to generate the audio content (i.e., synthesized speech) for this menu.

Figure 4:
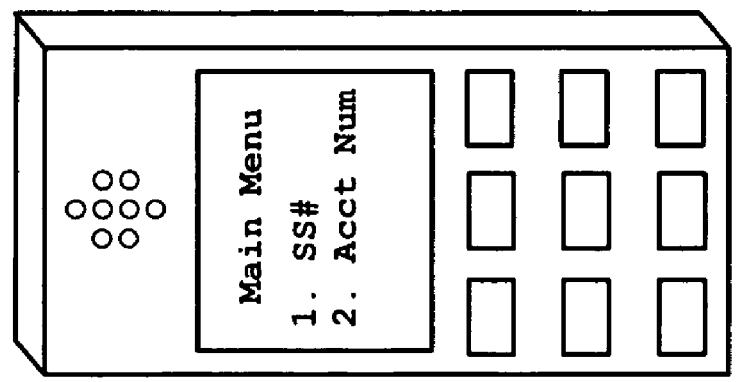
FIG. 4 depicts exemplary video content displayed at a telecommunications terminal, in accordance with the illustrative embodiment of the present invention.

FIG. 4 depicts exemplary video content displayed at a telecommunications terminal, in accordance with the illustrative embodiment of the present invention. The video content of FIG. 4 corresponds to the menu of the VXML document depicted in FIG. 3. As shown in FIG. 4, the text of the prompt tag has been greatly abridged for display at the terminal by reducing the text to its essentials and by using abbreviations. The method by which the illustrative embodiment generates such video content from a VXML document is described below and with respect to FIGS. 5 through 7.

Figure 5:
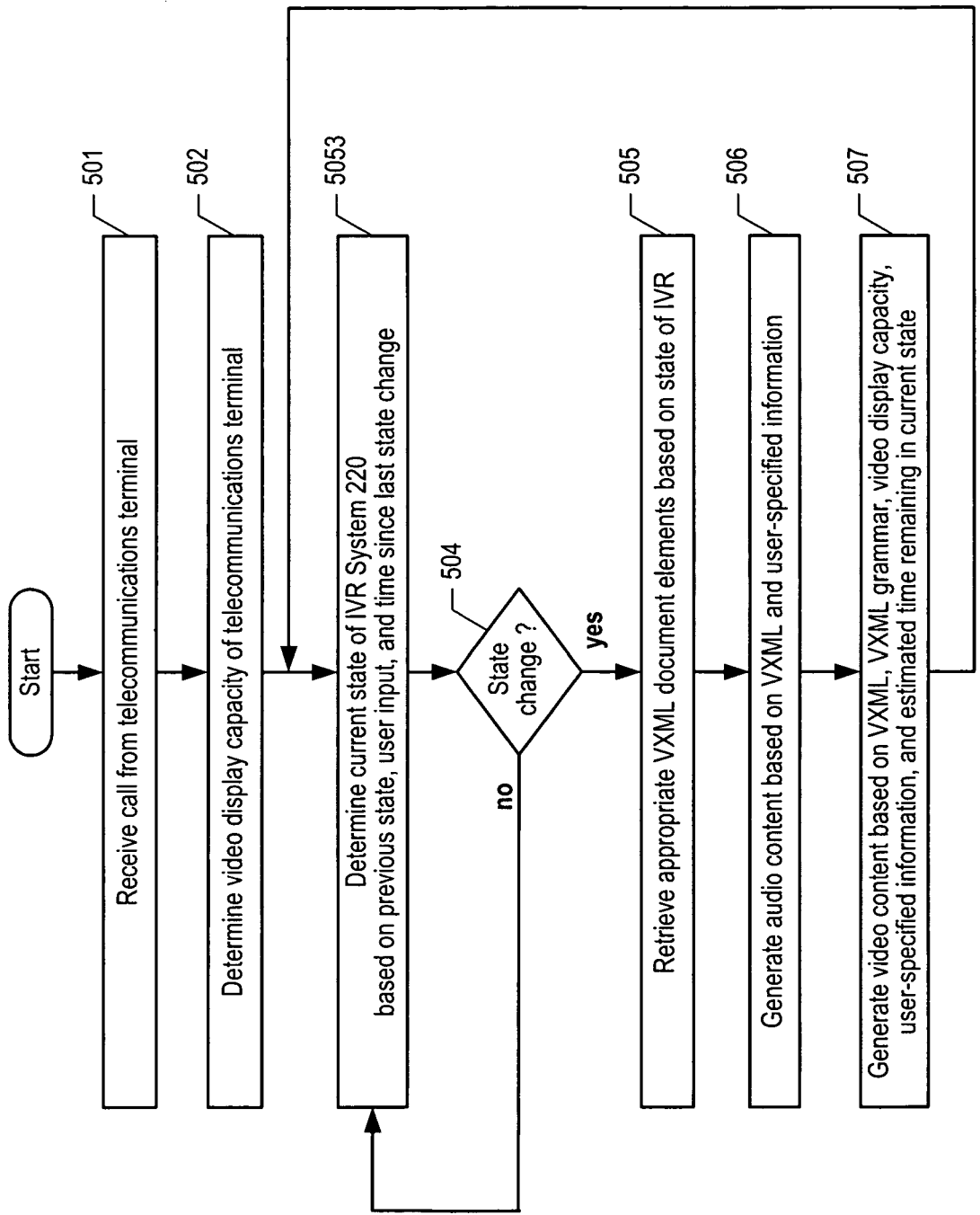
FIG. 5 depicts a flowchart of the salient tasks of interactive voice response system 220, as shown in FIG. 2, in accordance with the illustrative embodiment of the present invention.

FIG. 5 depicts a flowchart of the salient tasks of interactive voice response (IVR) system 220, in accordance with the illustrative embodiment of the present invention. It will be clear to those skilled in the art which tasks depicted in FIG. 5 can be performed simultaneously or in a different order than that depicted.

At task 501, interactive voice response (IVR) system 220 receives a call from a telecommunications terminal via telecommunications network 105 and private branch exchange (PBX) 110, in well-known fashion.

At task 502, interactive voice response (IVR) system 220 determines the video display capacity of the calling terminal. In the illustrative embodiment, the video display capacity is determined via the VoIP Session Initiation Protocol (SIP), which conveys information about the terminal type of the calling device when establishing a session.

At task 503, interactive voice response (IVR) system 220 determines its current state based on its previous state, user input (if any), and the time elapsed since the most recent state change.

Task 504 checks whether the current state determined at task 503 corresponds to a change in state; if so, execution proceeds to task 505, otherwise execution goes back to task 503.

At task 505, interactive voice response (IVR) system 220 retrieves, based on its current state, the appropriate VXML document element(s), in well-known fashion. In the illustrative embodiment of the present invention, such elements might include a menu prompt, a grammar for parsing the contents of the menu prompt (as described below and with respect to FIG. 7), etc.

At task 506, interactive voice response (IVR) system 220 generates audio content (e.g., synthesized speech, etc.) in accordance with the VXML document element(s) of task 505 and information specified by the user (e.g., social security number, etc.), if any, in well-known fashion.

At task 507, interactive voice response (IVR) system 220 generates video content based on the VXML elements of task 505 (including a grammar, if specified), the video display capacity of the calling terminal, user-specified information, and an estimate of the time remaining in the current state. Task 507 is described in detail below and with respect to FIGS. 6 and 7.

After task 507 is completed, execution loops back to task 503.

Figure 6:
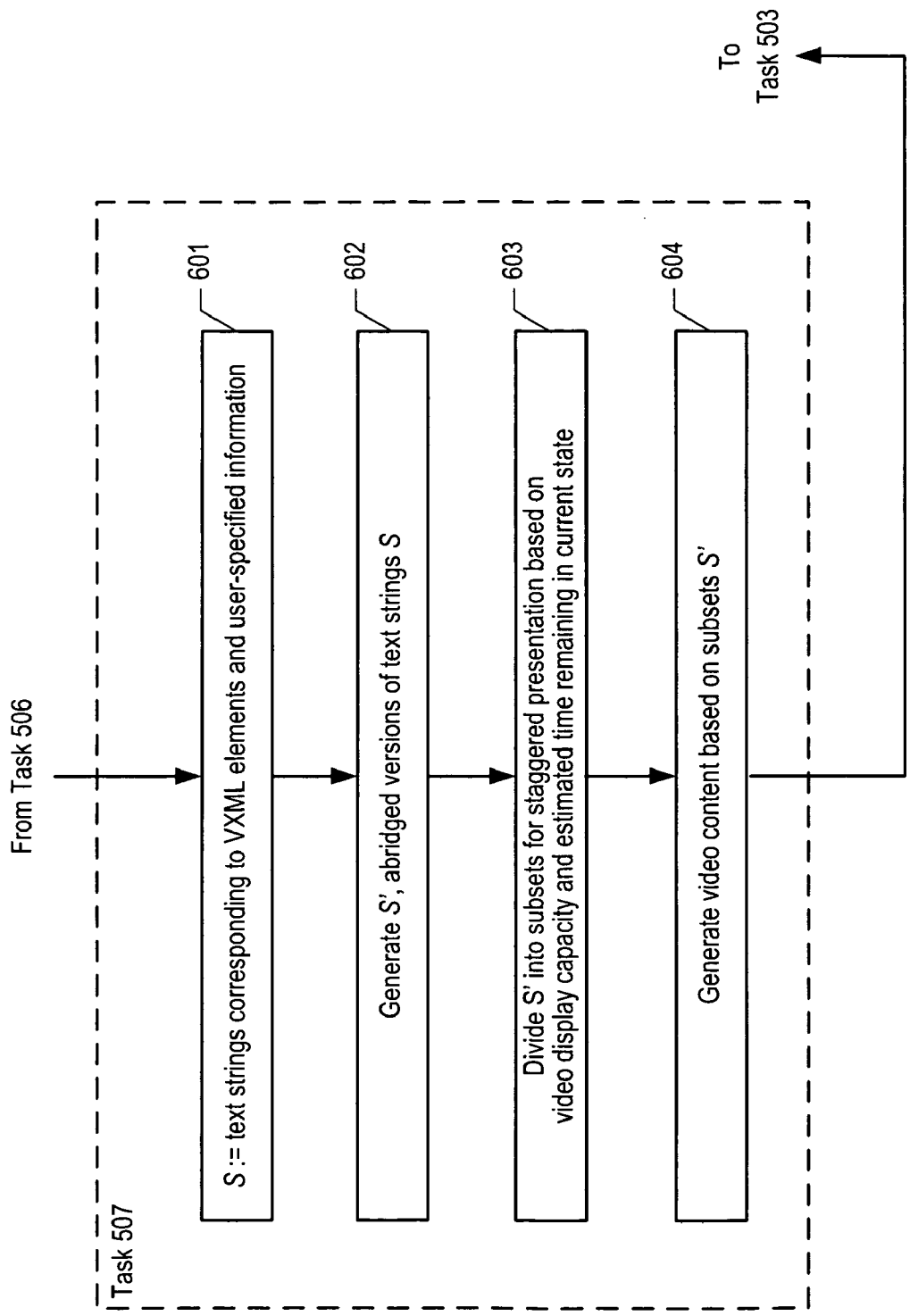
FIG. 6 depicts a detailed flowchart of task 507, as shown in FIG. 5, in accordance with the illustrative embodiment of the present invention.

FIG. 6 depicts a detailed flowchart of task 507, in accordance with the illustrative embodiment of the present invention. It will be clear to those skilled in the art which tasks depicted in FIG. 6 can be performed simultaneously or in a different order than that depicted.

At task 601, interactive voice response (IVR) system 220 initializes variable S to a set of text strings comprising the VXML elements of task 505 and the user-specified information.

At task 602, interactive voice response (IVR) system 220 generates a set S' of abridged versions of the text strings of set S. Task 602 is described in detail below and with respect to FIG. 7.

At task 603, interactive voice response (IVR) system 220 divides set S' into one or more non-empty subsets based on: the video display capacity of the calling terminal; and an estimate of the time remaining in the current state, which can be determined by factors such as the size of set S, the length of user input timeouts, etc. Dividing S' into subsets enables a staggered presentation of text blocks that are too long to fit in their entirety in the video display of the calling terminal (for example, displaying options 1-4 of a menu for five seconds, then clearing the screen and displaying options 5-7 of the menu).

At task 604, interactive voice response (IVR) system 220 generates video content based on subsets S', in well-known fashion. After task 604 is completed, execution loops back to task 503.

Figure 7:
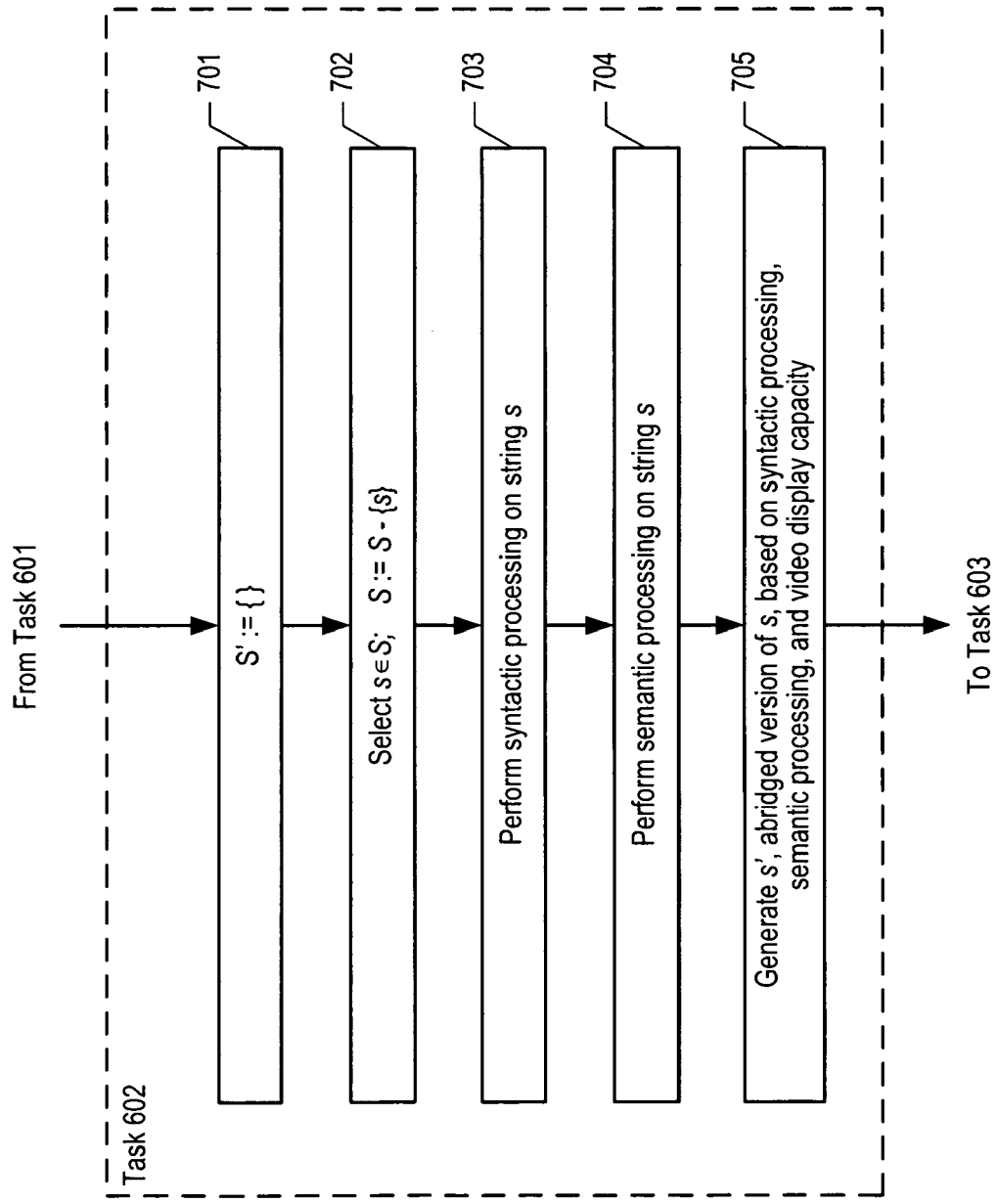
FIG. 7 depicts a detailed flowchart of task 602, as shown in FIG. 6, in accordance with the illustrative embodiment of the present invention.

FIG. 7 depicts a detailed flowchart of task 602, in accordance with the illustrative embodiment of the present invention. It will be clear to those skilled in the art which tasks depicted in FIG. 7 can be performed simultaneously or in a different order than that depicted.

At task 701, interactive voice response (IVR) system 220 initializes set S' to empty.

At task 702, interactive voice response (IVR) system 220 selects and removes a text string s from set S. The selection of any particular text string is immaterial, and therefore can be performed in the simplest manner possible for the data structure used for set S.

At task 703, interactive voice response (IVR) system 220 performs syntactic processing on text string s. As will be appreciated by those skilled in the art, in some embodiments the syntactic processing might comprise parsing the text string based on a grammar, while in some other embodiments, the syntactic processing might comprise a simple keyword search based on a vocabulary, or some other technique well-known in the art. In the illustrative embodiment, the text string is parsed based on a grammar that is specified in the VXML document. As will be appreciated by those skilled in the art, the grammar might be defined within the VXML document itself, or might be an external grammar specified by a uniform resource identifier (URI).

At task 704, interactive voice response (IVR) system 220 performs semantic processing on text string s. As will be appreciated by those skilled in the art, there are many techniques known in the art for extracting meaning from and reasoning about text, including semantic interpreters, knowledge-based systems, theorem provers, etc. In some alternative embodiments of the present invention, task 704 might not be performed; in such embodiments, the syntactic processing of task 703 can be used in conjunction with syntax-based heuristics for generating abridged text strings, as described below.

At task 705, interactive voice response (IVR) system 220 generates an abridged version s' of text string s based on the syntactic processing of task 703, the semantic processing of task 704 (if performed), and the video display capacity of the calling terminal. As will be appreciated by those skilled in the art, word abbreviations (e.g., "tel." for telephone, "SS#" for social security number, etc.) can be used as one method of abridging text string s, whether syntactic processing is employed alone or in conjunction with semantic processing. If syntactic processing is employed alone, a variety of techniques well-known in the art can be employed such as searching for key words or phrases, using only the object of a parsed sentence (e.g., the sentence "Please say or type your account number" would be reduced to the noun phrase "account number", etc.), and so forth. If semantic processing is also employed, then abridged text string s' can be generated based also on the meaning of text string s. For example, if a user calls Motorola's IVR system and says "I want to buy a Motorola Razr", the abridged string "Buy phone" might be displayed at the user's terminal (while the user is forwarded to the sales department), while if the user says "I want to buy 100 shares of Motorola", the abridged string "Buy stock" might be displayed at the user's terminal (while the user is forwarded to the investors relations department).

After task 705 is completed, execution continues at task 603.

Figure 8:
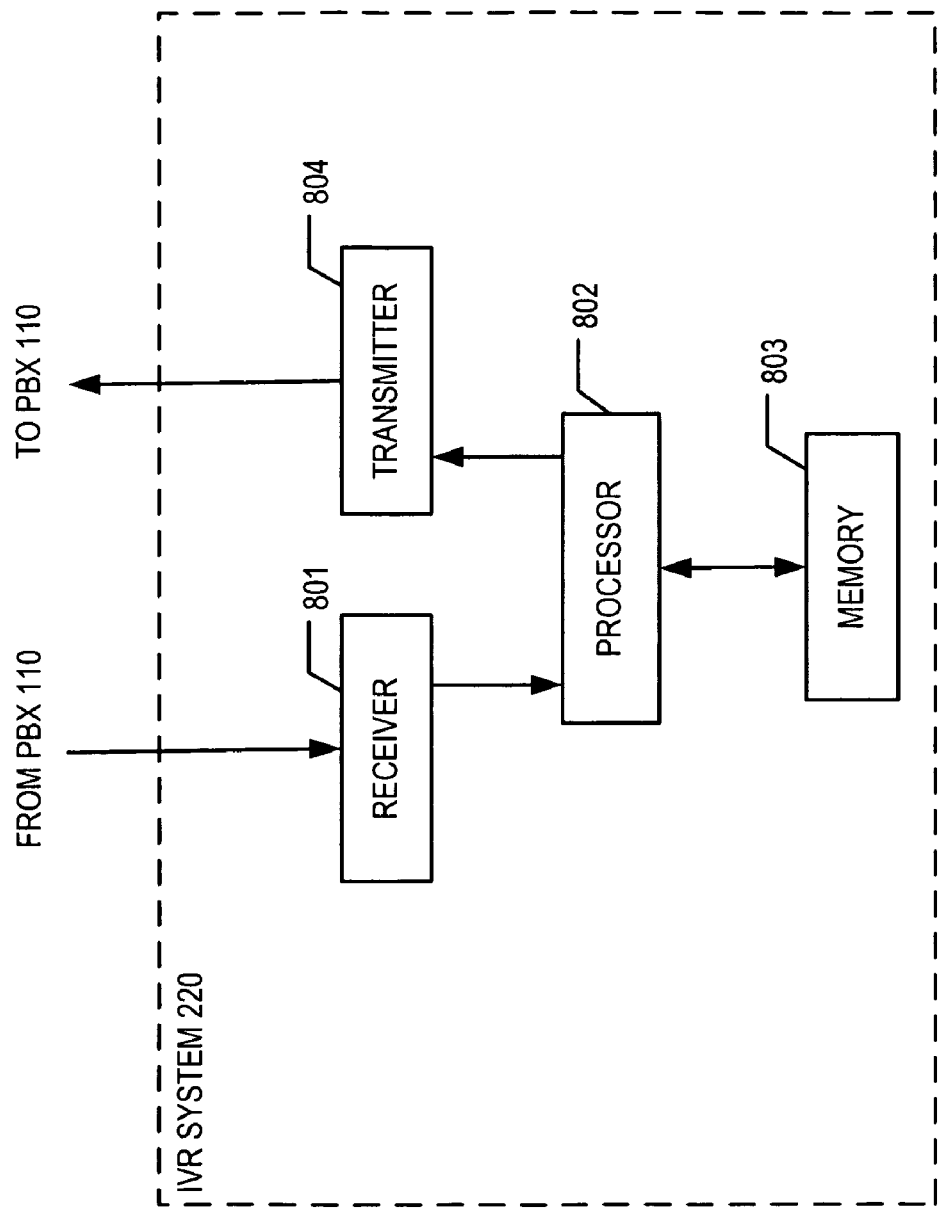
FIG. 8 depicts the salient elements of a first implementation of interactive voice response system 220, in accordance with the illustrative embodiment of the present invention.

FIG. 8 depicts the salient elements of a first implementation of interactive voice response (IVR) system 220, in accordance with the illustrative embodiment of the present invention. IVR system 220 comprises receiver 801, processor 802, memory 803, and transmitter 804, interconnected as shown.

Receiver 801 receives signals from private branch exchange (PBX) 110 and forwards the information encoded in the signals to processor 802, in well-known fashion. It will be clear to those skilled in the art, after reading this specification, how to make and use receiver 801.

Processor 802 is a general-purpose processor that is capable of receiving information from receiver 801, of executing instructions stored in memory 803 (including, in particular, instructions corresponding to the tasks of FIG. 5 through 7), of reading data from and writing data into memory 803, and of transmitting information to transmitter 804. In some alternative embodiments of the present invention, processor 802 might be a special-purpose processor. In either case, it will be clear to those skilled in the art, after reading this specification, how to make and use processor 802.

Memory 803 stores data and executable instructions, as is well-known in the art, and might be any combination of random-access memory (RAM), flash memory, disk drive memory, etc. It will be clear to those skilled in the art, after reading this specification, how to make and use memory 803.

Transmitter 804 receives information from processor 802 and transmits signals that encode this information (including audio and video signals) to private branch exchange (PBX) 110, in well-known fashion. It will be clear to those skilled in the art, after reading this specification, how to make and use transmitter 804.

Figure 9:
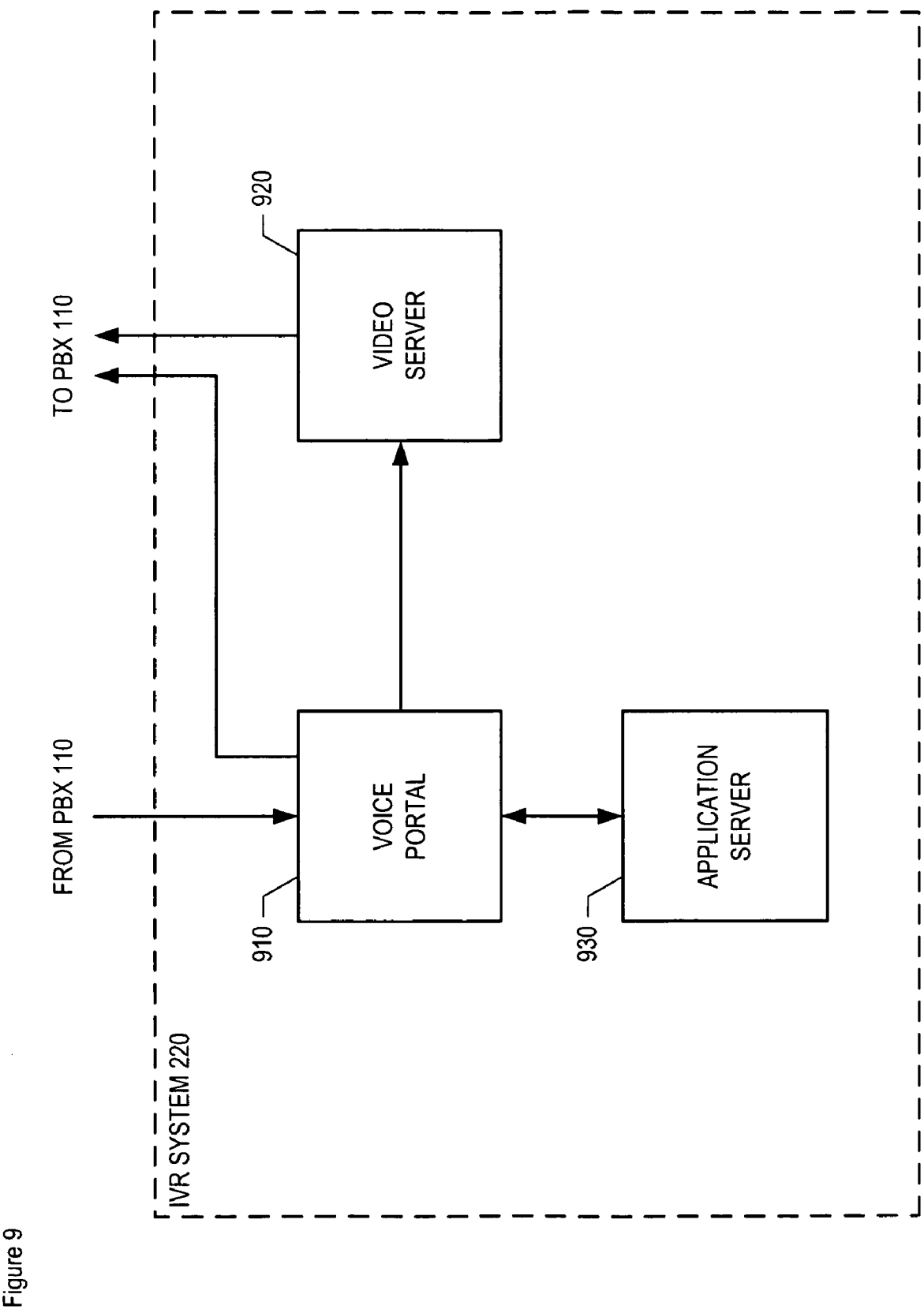
FIG. 9 depicts the salient elements of a second implementation of interactive voice response system 220, in accordance with the illustrative embodiment of the present invention.

FIG. 9 depicts the salient elements of a second implementation of interactive voice response system 220, in accordance with the illustrative embodiment of the present invention. As shown in FIG. 9, the second implementation of IVR system 220 comprises multiple "boxes" (i.e., computers) and as such is illustrated at the "system" level, rather than at the "component" level as employed in FIG. 8.

Interactive voice response (IVR) system 220 comprises voice portal 910, video server 920, and application server 930, interconnected as shown.

Voice portal 910 is a server-hosted application that receives Voice over Internet Protocol (VoIP) audio streams from telecommunications terminals via private branch exchange (PBX) 110, transmits VoIP audio content to telecommunications terminals via PBX 110, receives VXML documents from application server 930, transmits VXML documents to application server 930, performs VXML core services and processing (e.g., speech recognition, speech generation, etc.), and transmits VXML application state to video server 920.

Video server 920 is a server that receives VXML application state from voice portal 910, generates video content in accordance with the methods of FIGS. 5 through 7, and transmits video content to telecommunications terminals via private branch exchange (PBX) 110.

Application server 930 hosts one or more web-based applications (e.g., for retrieving customer account records, etc.) and stores data for these applications, receives VXML documents from voice portal 910, renders VXML documents, and transmits VXML documents to voice portal 910.

As will be appreciated by those skilled in the art, in some embodiments of the present invention each of voice portal 910, video server 920, and application server 930 might be on separate physical servers, while in some other embodiments two or all three of these might be on a common physical server.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising generating video content during a call that involves an interactive voice response system and a telecommunications terminal, wherein said video content is based on
   (i) one or more elements of a Voice eXtensible Markup Language document,
   (ii) an estimate of the time remaining in the current state of a Voice eXtensible Markup Language application of said interactive voice response system, and
   (iii) the video display capacity of said telecommunications terminal.

2. The method of claim 1 wherein said one or more elements of said Voice eXtensible Markup Language document comprises a text string from which said interactive voice response system generates audio content.

3. The method of claim 2 wherein generating said video content comprises generating an abridged version of said text string.

4. The method of claim 3 wherein generating said abridged version of said text string comprises syntactic processing.

5. The method of claim 4 wherein said syntactic processing is based on a grammar that is specified by a uniform resource identifier in said Voice Extensible Markup Language document.

6. The method of claim 3 wherein generating said abridged version of said text string comprises semantic processing.

7. The method of claim 1 wherein said video content is also based on the time spent in said state of said Voice eXtensible Markup Language application.

8. The method of claim 1 wherein said video content is also based on information input to said interactive voice response system during said call.

9. A method comprising:
   (a) receiving a datum that is input via a telecommunications terminal during a call that involves an interactive voice response system and said telecommunications terminal;
   (b) when the video display capacity of said telecommunications terminal is below a threshold, generating video content that contains an abridged version of said datum, and
      otherwise, generating video content that contains an unabridged version of said datum; and
   (c) presenting said video content at said telecommunications terminal.

10. The method of claim 9 wherein said abridged version of said datum is generated via syntactic processing.

11. The method of claim 9 wherein said abridged version of said datum is generated via semantic processing.

12. The method of claim 9 wherein said video content is also based on the state of said interactive voice response system.

13. The method of claim 9 wherein said video content is based on one or more elements of a Voice eXtensible Markup Language document, and wherein said one or more elements of said Voice eXtensible Markup Language document comprises a text string from which said interactive voice response system generates audio content.

14. A method comprising:
   (a) receiving at a data-processing system a datum that is input via a telecommunications terminal during a call;
   (b) generating a new state for said data-processing system based on the prior state of said data-processing system and on said datum;
   (c) generating audio content based on a text string that is associated with said new state; and
   (d) when the video display capacity of said telecommunications terminal is below a threshold, generating video content that is based on said new state, said text string, and an abridged version of said datum, and
      otherwise, generating video content that is based on said new state, said text string, and an unabridged version of said datum.

15. The method of claim 14 wherein said abridged version of said datum is generated via syntactic processing.

16. The method of claim 15 wherein said text string is part of a Voice Extensible Markup Language document, and wherein said syntactic processing is based on a grammar that is specified by a uniform resource identifier in said Voice Extensible Markup Language document.

17. The method of claim 14 wherein said abridged version of said datum is generated via semantic processing.

* * * * *